United States Patent
Hill et al.

(10) Patent No.: US 7,532,406 B2
(45) Date of Patent: May 12, 2009

(54) DEVICE FOR HOMOGENIZING LIGHT

(75) Inventors: Wieland Hill, Dortmund (DE); Mikhail Petrov, Düsseldorf (DE); Heiko Ganser, Dortmund (DE)

(73) Assignee: Hentze-Lissotschenko Patentverwaltungs GmbH & Co. KG, Gerstengrund (DE)

( * ) Notice: Subject to any disclaimer, the term of this patent is extended or adjusted under 35 U.S.C. 154(b) by 0 days.

(21) Appl. No.: 11/825,800

(22) Filed: Jul. 9, 2007

(65) Prior Publication Data

US 2008/0002261 A1 Jan. 3, 2008

Related U.S. Application Data

(63) Continuation of application No. PCT/EP2005/000103, filed on Jan. 7, 2005.

(51) Int. Cl.
*G02B 21/10* (2006.01)
*G03B 21/60* (2006.01)
*F21S 8/00* (2006.01)

(52) U.S. Cl. .................. 359/623; 359/619; 359/622; 359/626; 359/455; 359/497; 362/268

(58) Field of Classification Search ......... 359/619–624, 359/626, 627, 455, 456, 483, 485, 487, 497, 359/558, 593; 362/259, 268, 553; 372/24, 372/25, 28, 29, 101; 369/13.29, 44.23; 425/208, 425/209; 366/83–85, 88; 353/20, 33, 102; 356/521
See application file for complete search history.

(56) References Cited

U.S. PATENT DOCUMENTS

| | | | | |
|---|---|---|---|---|
| 1,943,995 A | * | 1/1934 | Weld | 359/593 |
| 3,484,599 A | * | 12/1969 | Little | 362/268 |
| 3,641,255 A | * | 2/1972 | Macovski | 348/291 |
| 5,757,547 A | * | 5/1998 | Rodman et al. | 359/497 |
| 6,081,378 A | * | 6/2000 | Romano et al. | 359/497 |
| 6,690,515 B2 | * | 2/2004 | McCulloch et al. | 359/624 |
| 7,085,062 B2 | | 8/2006 | Hauschild | 359/626 |
| 7,092,415 B2 | * | 8/2006 | Tanaka | 372/25 |
| 7,210,820 B2 | | 5/2007 | Broude et al. | 362/268 |
| 2004/0223330 A1 | | 11/2004 | Broude et al. | 362/268 |
| 2005/0018294 A1 | | 1/2005 | Hauschild | 359/558 |

FOREIGN PATENT DOCUMENTS

EP 1 489 438 A1 12/2004
WO WO 2004/102256 A1 11/2004

* cited by examiner

*Primary Examiner*—Loha Ben
(74) *Attorney, Agent, or Firm*—Laurence A. Greenberg; Werner H. Stemer; Ralph E. Locher

(57) ABSTRACT

A device for homogenizing light has at least two cylindrical lens arrays which are placed one behind the other in a direction of diffusion of the light to be homogenized and which each have convex and concave cylindrical lenses disposed next to one another in an alternating manner, the cylinder axes of these cylindrical lenses are aligned parallel to one another. In the direction, in which the cylindrical lenses are disposed next to one another, the concave cylindrical lenses of the first cylindrical lens array have a shaping, in particular, an extension or curvature different from that of the concave cylindrical lenses of the second cylindrical lens arrays.

16 Claims, 4 Drawing Sheets

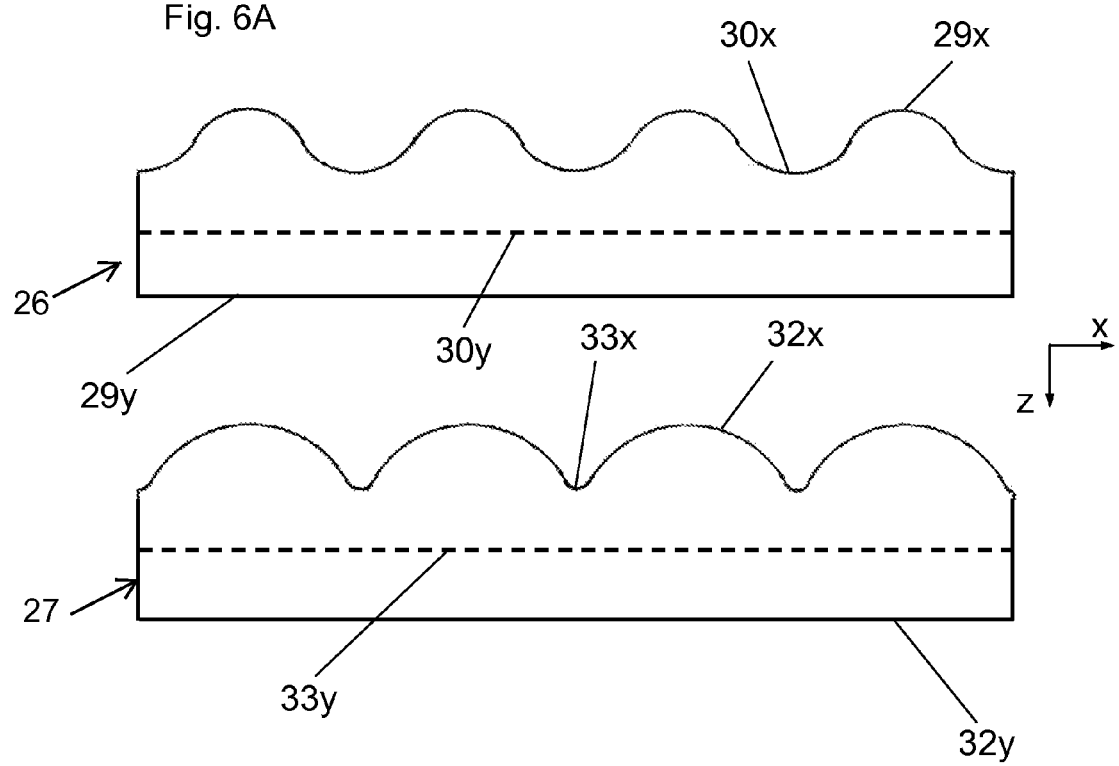
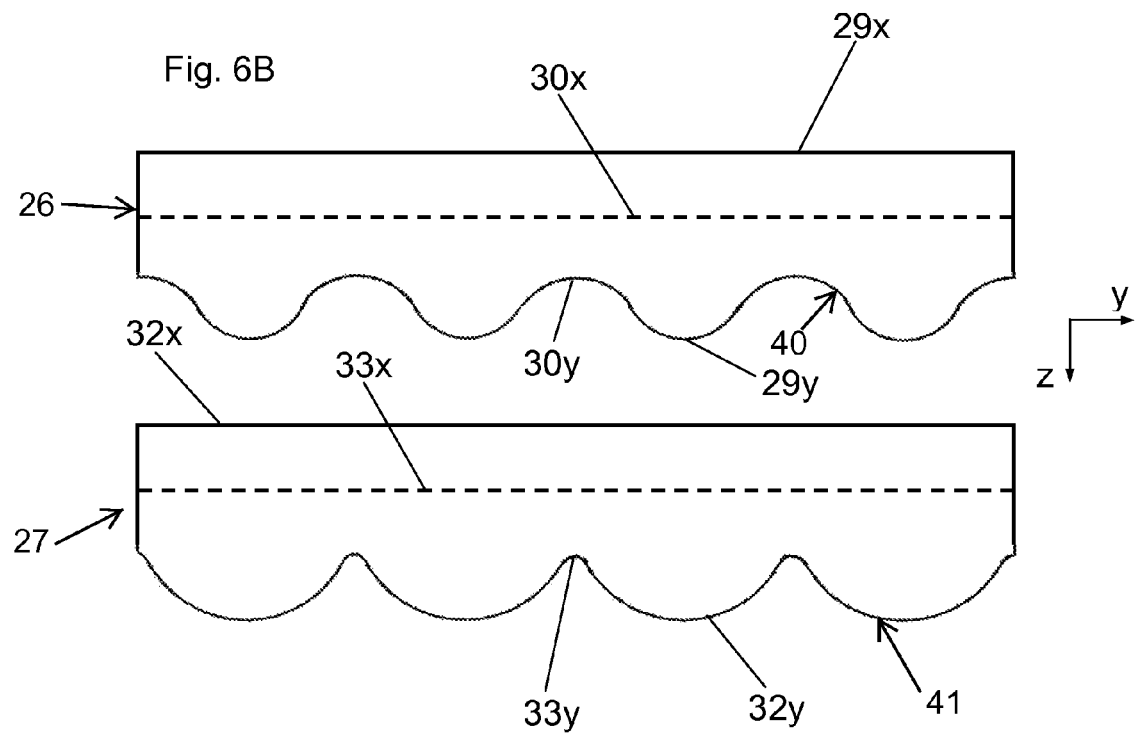

DEVICE FOR HOMOGENIZING LIGHT

CROSS-REFERENCE TO RELATED APPLICATION

This is a continuing application, under 35 U.S.C. § 120, of copending international application No. PCT/EP2005/000103, filed Jan. 7, 2005, which designated the United States; the prior application is herewith incorporated by reference in its entirety.

BACKGROUND OF THE INVENTION

Field of the Invention

The present invention relates to a device for homogenizing light containing a first cylindrical lens array through which the light to be homogenized can pass. The first cylindrical lens array has convex and concave cylindrical lenses with mutually parallel cylinder axes that are disposed next to one another in an alternating fashion. Furthermore, a second cylindrical lens array is provided through which the light that has passed through the first cylindrical lens array can pass. The second cylindrical lens array has convex and concave cylindrical lenses with mutually parallel cylinder axes that are disposed next to one another in an alternating fashion, and the cylinder axes of the cylindrical lenses of the second cylindrical lens array are aligned parallel to the cylinder axes of the cylindrical lenses of the first cylindrical lens array. The present invention further relates to a device using cylindrical mirror arrays instead of lens arrays.

The above-named device is also intended to include cylindrical lens arrays with concave cylindrical lenses that are much smaller than the convex cylindrical lenses adjacent to them. For example, the concave cylindrical lenses can be merely depressions or approximately flat regions in the interspace between two convex cylindrical lenses. Devices of the aforementioned type are known. Such devices are used, for example, to homogenize comparatively inhomogeneous light such as issues, for example, from an excimer laser or from a laser diode bar. FIG. 1 shows schematically the operating principle of such homogenization devices. In the case of the device depicted therein, the first cylindrical lens array 1 is disposed on a first substrate 2 and the second cylindrical lens array 3 is disposed on a second substrate 4, the substrates 2, 4 being spaced apart from one another. Inhomogeneous light 5 striking the device is homogenized by the device by virtue of the fact that the individual cylindrical lenses of the cylindrical lens arrays 1, 3 distributes the light homogeneously over an angular range of the light field 6 emerging from the device. A field lens disposed downstream of the second substrate 4 can be used to transform the homogeneous angular distribution in the emerging light field 6 into a correspondingly homogeneous spatial distribution in an operating plane.

As a rule, in the case of devices of the type mentioned at the beginning, the focal length of the convex cylindrical lenses of the second cylindrical lens array 3 will correspond approximately to the distance between the first and the second cylindrical lens arrays. In this way, the convex cylindrical lenses of the second cylindrical lens array will image a plane perpendicular to the propagation direction of the incident inhomogeneous light 5 in the region of the first cylindrical lens array into an operating plane.

FIG. 2 shows in detail how incident inhomogeneous light 5 runs through convex and concave cylindrical lenses 7, 8 of the first cylindrical lens array 1 and convex and concave cylindrical lenses 9, 10 of the second cylindrical lens array 3. In particular in FIG. 2 are a component beam 11, running in the left-hand image area, and a component beam 12, running in the right-hand image area. These component beams 11, 12 of the light 5 to be homogenized pass through two concave cylindrical lenses 8 of the first cylindrical lens array. It is to be seen that the component beams 11, 12 are deflected to a large part through the concave cylindrical lenses 8 onto a convex cylindrical lens 9 of the second cylindrical lens array 3. The convex cylindrical lens 9 reflects the imaged component beams 11, 12 at an angle such that upon superposition with the aid of a field lens they pass into the outer lateral regions of an illuminated region in an operating plane.

This situation is illustrated schematically in FIG. 3. In FIG. 3, the intensity in an operating plane is plotted against a spatial coordinate or else against an angular coordinate. The light distribution depicted in FIG. 3 has a middle, substantially homogeneous region 13 and two rises 14 at the end that are substantially caused by the aforementioned component beams 11, 12 or by further corresponding component beams that pass through the concave cylindrical lenses 8 of the first cylindrical lens array 1. An explanation for this contribution is to be seen in that the concave cylindrical lenses 8 of the first cylindrical lens array 1 exhibit a very small radius, and thus a focal length that is likewise very small. Consequently, the virtual focal points of the concave cylindrical lenses 8 lie approximately in the plane of the first cylindrical lens array 1 and are imaged in the operating plane by the convex cylindrical lenses 9 of the second cylindrical lens array 3.

The rises 14 to be seen in FIG. 3 and that are typical of the prior art are disruptive for a whole range of applications.

SUMMARY OF THE INVENTION

It is accordingly an object of the invention to provide a device for homogenizing light which overcomes the above-mentioned disadvantages of the prior art devices of this general type, which generates a more homogeneous light distribution in an operating plane.

With the foregoing and other objects in view there is provided, in accordance with the invention, a device for homogenizing light. The device contains a first cylindrical lens array through which the light to be homogenized passes. The first cylindrical lens array has convex and concave cylindrical lenses with mutually parallel cylinder axes disposed next to one another in an alternating fashion. A second cylindrical lens array is provided through which the light that has passed through the first cylindrical lens array can pass. The second cylindrical lens array has convex and concave cylindrical lenses with mutually parallel cylinder axes disposed next to one another in an alternating fashion. The mutually parallel cylinder axes of the cylindrical lenses of the second cylindrical lens array are aligned parallel to the mutually parallel cylinder axes of the cylindrical lenses of the first cylindrical lens array. In the given direction in which the cylindrical lenses are disposed next to one another, the concave cylindrical lenses of the first cylindrical lens array have a configuration other than that of the concave cylindrical lenses of the second cylindrical lens array in the given direction in which the cylindrical lenses are disposed next to one another.

It is provided that, in the direction in which the cylindrical lenses are disposed next to one another, the concave cylindrical lenses of the first cylindrical lens array exhibit a configuration other than the concave cylindrical lenses of the second cylindrical lens array in the direction in which the cylindrical lenses are disposed next to one another. For example, rises to be seen from FIG. 3 can be avoided by specifically varying the extent and/or the curvature of the concave cylindrical lenses of the first and/or the second cylindrical lens array.

For example, it can be provided in this case that, in the direction in which the cylindrical lenses are disposed next to one another, the concave cylindrical lenses of the second cylindrical lens array are larger, preferably much larger than the concave cylindrical lenses of the first cylindrical lens array. For example, the concave cylindrical lenses of the second cylindrical lens array can be at least twice as large in this direction as the concave cylindrical lenses of the first cylindrical lens array. By enlarging the concave cylindrical lenses of the second cylindrical lens array it is possible at least partially to prevent the component beams that have passed through the concave cylindrical lenses of the first cylindrical lens array from striking convex cylindrical lenses of the second cylindrical lens array. However, this results in that these component beams that have passed through the concave cylindrical lenses of the first cylindrical lens array are no longer capable of being deflected or imaged by the convex cylindrical lenses of the second cylindrical lens array into the lateral regions of the light field in the operating plane. The rises are thereby eliminated. The homogeneous region 13 to be seen from FIG. 3 is thereby enlarged. In particular, because of the fact that the component beams that have passed through the concave cylindrical lenses of the first cylindrical lens array pass through the concave cylindrical lenses of the second cylindrical lens array, the outcome is that these component beams are distributed substantially over the entire width of the homogenized light field in the operating plane. The efficiency of the device (the light quantity in the homogeneous region or the light quantity overall) is raised in this way.

There is, moreover, the possibility that, in the direction in which the cylindrical lenses are disposed next to one another, the convex cylindrical lenses of the first cylindrical lens array are larger, in particular larger by a multiple than the concave cylindrical lenses of the first cylindrical lens array. In particular, the concave cylindrical lenses can constitute merely depressions or virtually flat regions between the convex cylindrical lenses of the first cylindrical lens array.

As in the prior art, it is also possible in the case of the present invention that the focal length of the convex cylindrical lenses of the second cylindrical lens array is approximately as large as the distance between the first cylindrical lens array and the second cylindrical lens array. The plane of the first cylindrical lens array is imaged into the operating plane in this way by the convex cylindrical lenses of the second cylindrical lens array.

In accordance with a further preferred embodiment of the present invention, it is possible that the focal length of the concave cylindrical lenses of the first cylindrical lens array is substantially larger than the focal length of the convex cylindrical lenses of the second cylindrical lens array. As a result of this it can be achieved that the virtual focal points of the concave cylindrical lenses of the first cylindrical lens array are comparatively far removed from the focal plane of the second cylindrical lens array such that these focal points are not sharply imaged into the operating plane by the convex cylindrical lenses of the second cylindrical lens array. It is possible to achieve, in this way, that no rises are caused in the lateral regions of the light distribution in the operating plane even given comparatively small concave cylindrical lenses of the second cylindrical lens array, and therefore even given component beams that have passed through the convex cylindrical lenses of the second cylindrical lens array and previously passed through the concave cylindrical lenses of the first cylindrical lens array.

It is, in particular, possible that, in the direction in which the cylindrical lenses are disposed next to one another, the concave cylindrical lenses of the first cylindrical lens array exhibit approximately the same extent as the convex cylindrical lenses of the first cylindrical lens array in the direction in which the cylindrical lenses are disposed next to one another. In the case of such an arrangement, the focal points of the concave cylindrical lenses can be clearly removed from the plane of the first cylindrical lens array.

It is possible that the device contains a substrate on which the first cylindrical lens array and the second cylindrical lens array are disposed on mutually opposite sides. The substrate can then exhibit an appropriate thickness such that the first cylindrical lens array is removed from the second cylindrical lens array at the distance of the focal length of the convex cylindrical lenses thereof.

It is, alternatively, possible that the device contains a first substrate and a second substrate differing from the first, in particular spaced apart from the first substrate, the first cylindrical lens array being disposed on the first substrate and the second cylindrical lens array being disposed on the second substrate. In the case of such a device, the distance between the substrates can then be adapted such that the distance between the first and second cylindrical lens array corresponds to the focal length of the convex cylindrical lenses of the second cylindrical lens array.

In the case of such a device, it is, furthermore, possible that the device contains a third cylindrical lens array, which is disposed on the side of the first substrate that is opposite the first cylindrical lens array, and has convex and concave cylindrical lenses with mutually parallel cylinder axes that are disposed next to one another in an alternating fashion. The cylinder axes of the cylindrical lenses of the first cylindrical lens array are disposed perpendicular to the cylinder axes of the cylindrical lenses of the third cylindrical lens array.

It can be provided, as an alternative or in addition thereto, that the device further contains a fourth cylindrical lens array, which is disposed on the side of the second substrate that is opposite the second cylindrical lens array, and has convex and concave cylindrical lenses with mutually parallel cylinder axes that are disposed next to one another in an alternating fashion. The cylinder axes of the cylindrical lenses of the second cylindrical lens array are disposed perpendicular to the cylinder axes of the cylindrical lenses of the fourth cylindrical lens array. The third and, if appropriate, fourth cylindrical lens arrays can be used to effect a homogenization of the light to be homogenized in a direction that is perpendicular to the direction in which the first and second cylindrical lens arrays contribute to a homogenization. To this end, the third and fourth cylindrical lens arrays can be configured in accordance with the first and second cylindrical lens arrays, in particular with regard to the widths of the concave cylindrical lenses of the third and fourth cylindrical lens arrays. Furthermore, the distance between the third and the fourth cylindrical lens arrays can also correspond substantially to the focal length of the convex cylindrical lenses of the third cylindrical lens array.

It can be provided that in the direction in which cylindrical mirrors are disposed next to one another, the concave cylindrical mirrors of the first cylindrical mirror array exhibit a configuration other than, in particular an extent other than and/or a curvature other than the concave cylindrical mirrors of the second cylindrical mirror array in the direction in which the cylindrical mirrors are disposed next to one another. Finally, the same advantages are attained by this transfer of the properties of the cylindrical lens arrays to the cylindrical mirror arrays.

In particular, the focal points of the concave cylindrical mirrors of the first cylindrical mirror array can therefore be disposed comparatively far from the plane of the first cylindrical mirror array. Furthermore, the concave cylindrical mirrors of the second cylindrical mirror array can also be larger, in particular much larger than the concave cylindrical mirrors of the first cylindrical mirror array. Furthermore, it is possible that the distance of the first cylindrical mirror array from the second cylindrical mirror array corresponds approximately to the focal length of the convex cylindrical mirrors of the second cylindrical mirror array. Furthermore, there can also be present third and/or fourth cylindrical mirror arrays which have cylindrical mirrors with cylinder axes that are aligned perpendicular to the cylinder axes of the cylindrical mirrors of the first and of the second cylindrical mirror arrays.

Other features which are considered as characteristic for the invention are set forth in the appended claims.

Although the invention is illustrated and described herein as embodied in a device for homogenizing light, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6A is a diagrammatic view of a section of the second embodiment of the device according to the invention;

FIG. 6B is a diagrammatic view of a section of a third embodiment of the device according to the invention.

DETAILED DESCRIPTION OF THE INVENTION

Figure 4:
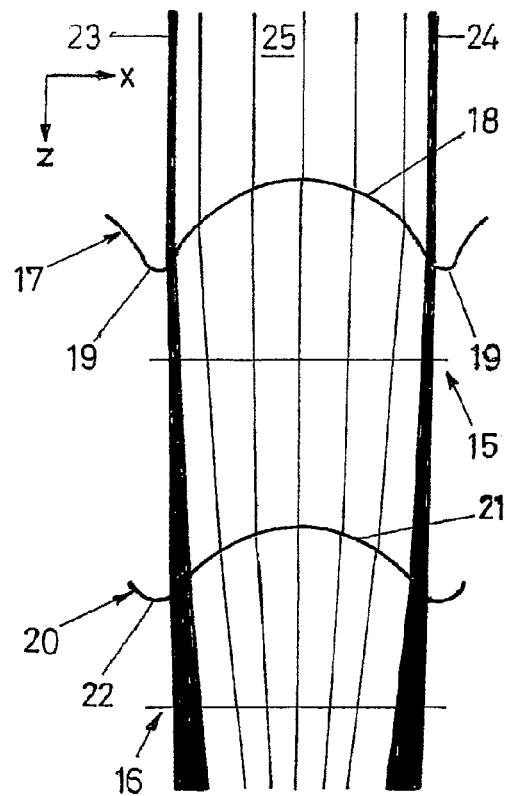
FIG. 4 a diagrammatic, side view of a section of a first embodiment of a device according to the invention.
Figure 5:
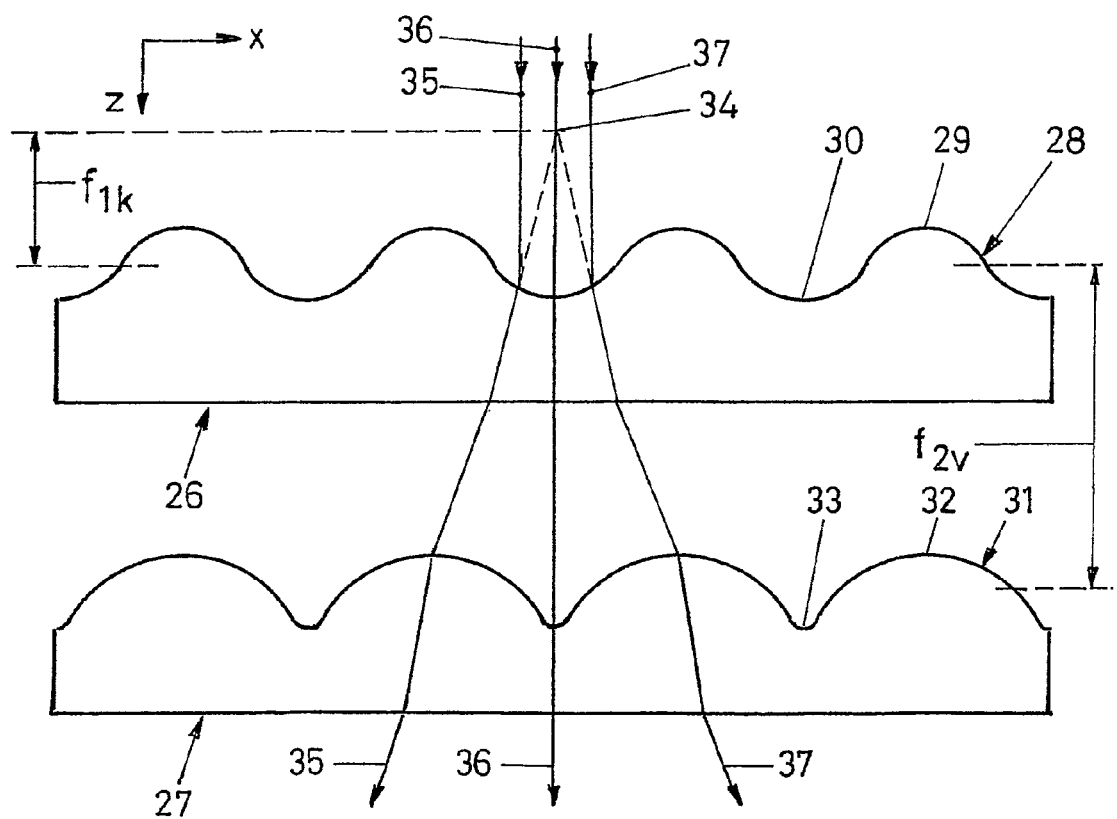
FIG. 5 is a diagrammatic view of a section of a second embodiment of the device according to the invention.

Cartesian coordinate systems are depicted in FIG. 4 and in FIG. 5 for the sake of elucidation. Referring now to the figures of the drawing in detail and first, particularly, to FIG. 4 thereof, there is shown a first embodiment of a device according to the invention that contains a first substrate 15 and a second substrate 16. The first substrate 15 has a first cylindrical lens array 17 on its entrance surface, whereas an exit surface is of a flat configuration. As an alternative thereto, it is also possible likewise to provide the exit surface with a cylindrical lens array that is, for example, aligned in a fashion crossing the first cylindrical lens array 17. The first cylindrical lens array 17 has convex cylindrical lenses 18 and concave cylindrical lenses 19 that are disposed next to one another in an alternating fashion. In the exemplary embodiment depicted in FIG. 4, only two concave cylindrical lenses 19 and one convex cylindrical lens 18 are indicated. However, a multiplicity of convex and concave cylindrical lenses 18, 19 can, or are to, be disposed next to one another in the X direction. In the X direction, that is to say in the direction in which the cylindrical lenses 18, 19 are disposed next to one another, the concave cylindrical lenses 19 are conspicuously less extended than the convex cylindrical lenses 18.

The second substrate 16 has on its entrance surface, that is to say on its side facing the first substrate 15, a second cylindrical lens array 20 with convex cylindrical lenses 21 and concave cylindrical lenses 22. The convex and concave cylindrical lenses 21, 22 are disposed next to one another in an alternating fashion in the X direction, it likewise being possible here to provide a multiplicity of convex and concave cylindrical lenses 21, 22 on the entrance surface of the substrate 16. Furthermore, it is to be seen from FIG. 4 that both the cylinder axes of the cylindrical lenses 18, 19 of the first cylindrical lens array 17, and the cylinder axes of the convex and concave cylindrical lenses 21, 22 of the second cylindrical lens array 20 are aligned in the Y direction, that is to say in a direction perpendicular to the direction X in which the cylindrical lenses 18, 19, 21, 22 are disposed next to one another. The exit surface of the second substrate 16 is likewise of a flat configuration. Alternatively, it would also be possible likewise to provide the exit surface of the second substrate 16 with a further cylindrical lens array in the case of which the cylinder axes of the cylindrical lenses could be aligned perpendicular to the cylinder axes of the cylindrical lenses 21, 22 of the second cylindrical lens array 20.

It is to be seen from FIG. 4 that in the X direction, that is to say in the direction in which the cylindrical lenses 18, 19, 21, 22 are disposed next to one another, the concave cylindrical lenses 22 of the second cylindrical lens array 20 are much larger than the concave cylindrical lenses 19 of the first cylindrical lens array 17. In particular, in this exemplary embodiment the concave cylindrical lenses 22 of the second cylindrical lens array 20 are approximately twice as wide as the concave cylindrical lenses 19 of the first cylindrical lens array 17.

Figure 1:
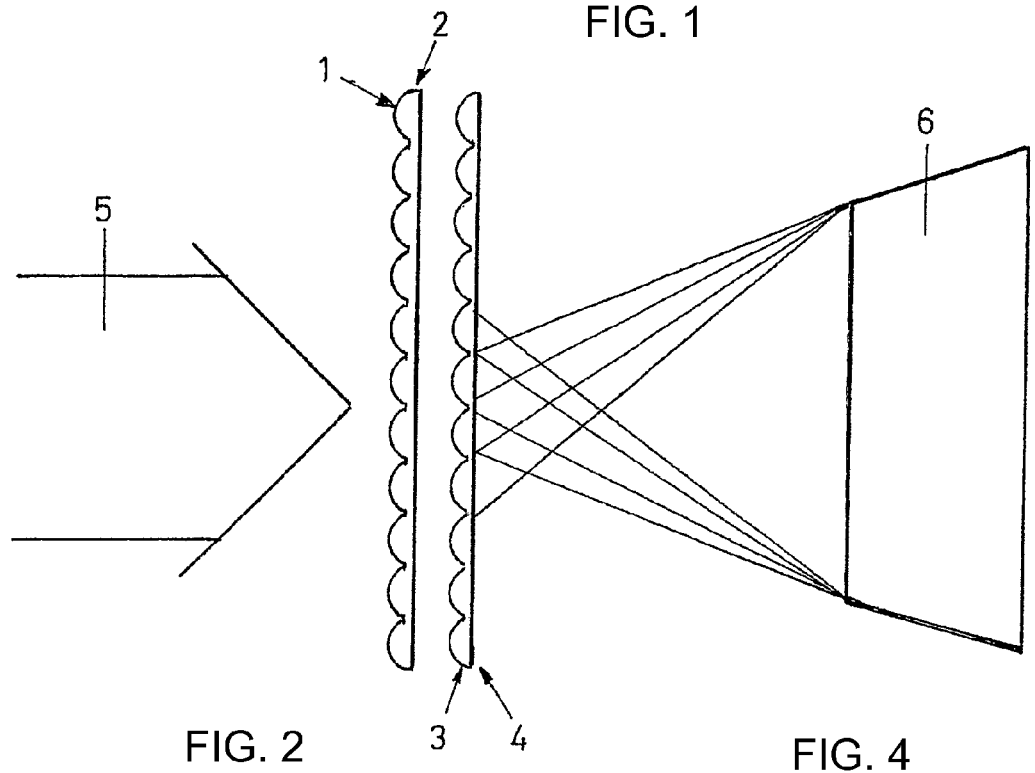
FIG. 1 is a schematic diagram for illustrating the operating principle of a device for homogenizing light.
Figure 2:
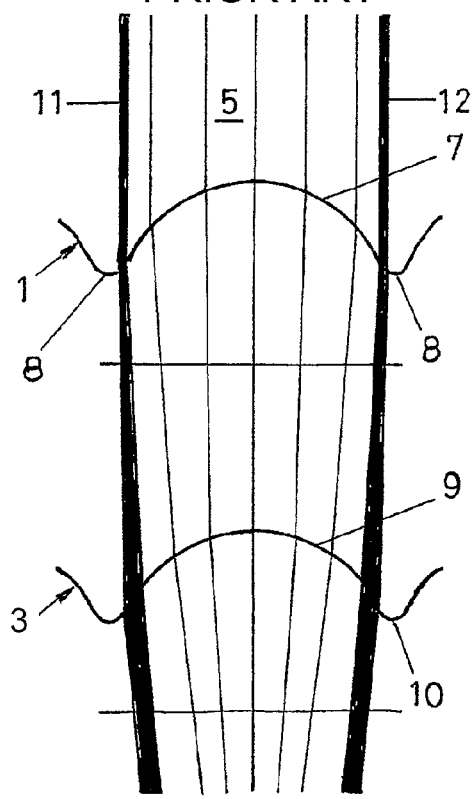
FIG. 2 a diagrammatic, side view of a device for homogenizing light in accordance with the prior art.
Figure 3:
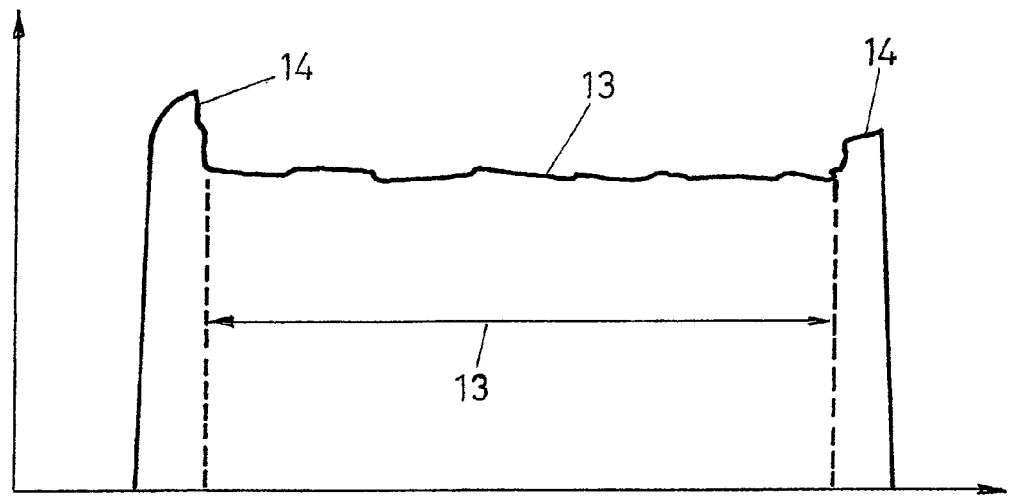
FIG. 3 is a graph illustrating a light distribution in an operating plane that is generated by the prior device for homogenizing light in accordance with FIG. 2.

Also depicted in FIG. 4 are component beams 23, 24 of the light 25 to be homogenized that pass through the concave cylindrical lenses 19 of the first cylindrical lens array 17. By contrast with the component beams 11, 12 in accordance with the prior art (see FIG. 2), the component beams 23, 24 do not pass through the convex cylindrical lenses 21 of the second cylindrical lens array 20, or do so only insubstantially, but pass through the expanded concave cylindrical lenses 22 of the second cylindrical lens array. Consequently, the component beams 23, 24 of the concave cylindrical lenses 22 of the second cylindrical lens array 20 are deflected in such a way that they are distributed in the operating plane over a wide region, in particular over the entire width of the homogenized light field. The lateral rises 14 in accordance with the prior art, which are to be seen from FIG. 3, are avoided in this way.

The second embodiment, to be seen from FIG. 5, of the device according to the invention also contains a first substrate 26 and a second substrate 27. On its entrance surface, the first substrate 26 has a first cylindrical lens array 28 with convex cylindrical lenses 29 and concave cylindrical lenses 30. On its entrance surface, that is to say on its side facing the first substrate 26, the second substrate 27 has a second cylindrical lens array 31 with convex cylindrical lenses 32 and concave cylindrical lenses 33. In the case of both substrates 26, 27, not only the depicted numbers of cylindrical lenses 29, 30, 32, 33, but a multiplicity of cylindrical lenses 29, 30, 32, 33 can be disposed next to one another in an alternating fashion.

In the case of the exemplary embodiment in accordance with FIG. 5, by contrast with the exemplary embodiment in accordance with FIG. 4, in the X direction, that is to say in the direction in which the cylindrical lenses 29, 30 are disposed next to one another in an alternating fashion, the concave cylindrical lenses 30 of the first cylindrical lens array 28 are approximately of the same width or the same extent as the convex cylindrical lenses 29 of the first cylindrical lens array 28. By contrast therewith, the concave cylindrical lenses 33 of the second cylindrical lens array 31 are conspicuously smaller than the convex cylindrical lenses 32 of the second cylindrical lens array 31.

On the basis of the substantially equal width of the concave and convex cylindrical lenses 30, 29 of the first cylindrical lens array 28, a focal length $f_{1k}$ of the concave cylindrical lenses 30 of the first cylindrical lens array 28 is comparatively large, that is to say, in particular, approximately twice as large as the height or the extent of the convex cylindrical lenses 29 in a propagation direction Z of the light to be homogenized. Furthermore, a focal length $f_{2v}$ of the convex cylindrical lenses 32 of the second cylindrical lens array 31 is depicted in FIG. 5 by way of explanation. It may be gathered from FIG. 5 that this focal length $f_{2v}$ of the convex cylindrical lenses 32 corresponds approximately to the distance between the first cylindrical lens array 28 and the second cylindrical lens array 31. Because of the comparatively large focal length $f_{1k}$ of the concave cylindrical lenses 30 of the first cylindrical lens array 28, the virtual focal point 34 indicated schematically in FIG. 5 of the concave cylindrical lenses 30 is not imaged into the operating plane by the convex cylindrical lens 32 of the second cylindrical lens array 31. This is illustrated in FIG. 5 by component beams 35, 36, 37 depicted by way of example.

In the case both of the embodiment in accordance with FIG. 4 and of the embodiment in accordance with FIG. 5, the vertex lines of the convex cylindrical lenses 18, 29 of the first cylindrical lens arrays 17, 28 are aligned with the vertex lines of the convex cylindrical lenses 21, 32 of the second cylindrical lens array 20, 31 in the propagation direction of the light to be homogenized. Furthermore, the vertex lines of the concave cylindrical lenses 19, 30 of the first cylindrical lens array 17, 28 are also aligned with the vertex lines of the concave cylindrical lenses 22, 33 of the second cylindrical lens array 20, 31.

FIG. 6A is equivalent to FIG. 5 with both views showing the x-z planes. However, the reference numbers in FIG. 6A are shown with an "x" extension to emphasize that they influence light only in the x-direction. It is, furthermore, possible that the device contains a third cylindrical lens array 40 as shown in FIG. 6B which shows the first and second substrates 26, 27 from the y-z plane. The third cylindrical lens array 40 is disposed on the side of the first substrate 26 that is opposite the first cylindrical lens array 28, and has convex and concave cylindrical lenses 29y, 30y respectively with mutually parallel cylinder axes that are disposed next to one another in an alternating fashion and influence light only in the y-direction. The cylinder axes of the cylindrical lenses 29, 30 of the first cylindrical lens array 28 are disposed perpendicular to the cylinder axes of the cylindrical lenses 29y, 30y of the third cylindrical lens array 40. it can be provided, as an alternative or in addition thereto, that the device further contains a fourth cylindrical lens array 41, which is disposed on the side of the second substrate 27 that is opposite the second cylindrical lens array 31, and has convex and concave cylindrical lenses 32y, 33y respectively with mutually parallel cylinder axes that are disposed next to one another in an alternating fashion. The cylinder axes of the cylindrical lenses of the second cylindrical lens array 31 are disposed perpendicular to the cylinder axes of the cylindrical lenses of the fourth cylindrical lens array 41. The third and, if appropriate, fourth cylindrical lens arrays 40, 41 respectively can be used to effect a homogenization of the light to be homogenized in a direction that is perpendicular to the direction in which the first and second cylindrical lens arrays 28, 31 contribute to a homogenization. To this end, the third and fourth cylindrical lens arrays 40, 41 can be configured in accordance with the first and second cylindrical lens arrays 28, 31, in particular with regard to the widths of the concave cylindrical lenses of the third and fourth cylindrical lens arrays 40, 41. Furthermore, the distance between the third and the fourth cylindrical lens arrays 40, 41 can also correspond substantially to the focal length of the convex cylindrical lenses of the third cylindrical lens array.

Figure 7A:
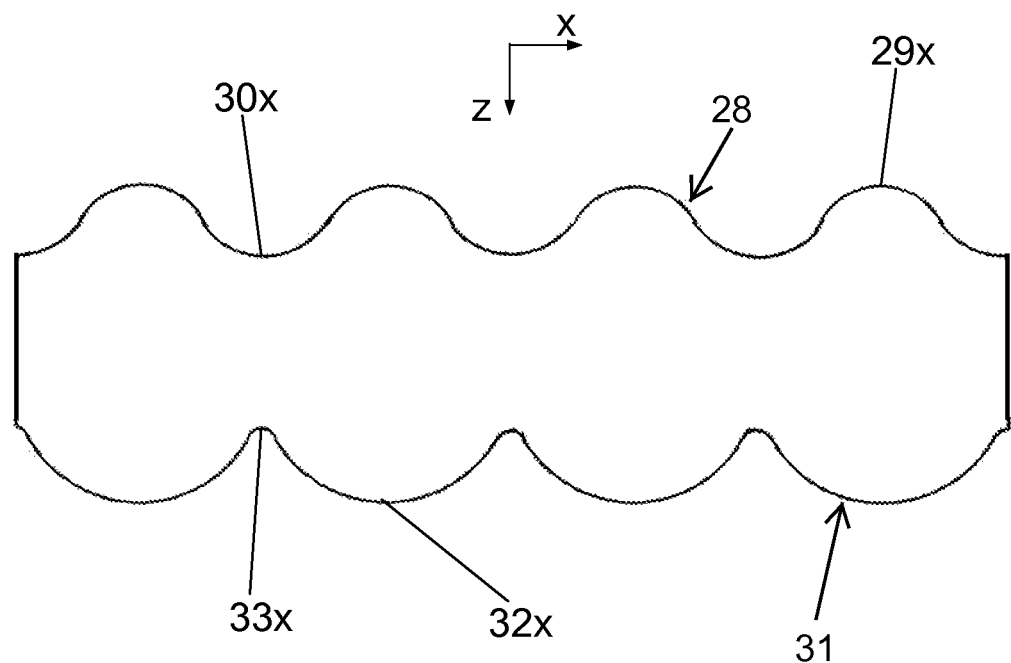
FIGS. 7A and 7B are diagrammatic views of sections of a fourth embodiment of the device according to the invention.
Figure 7B:
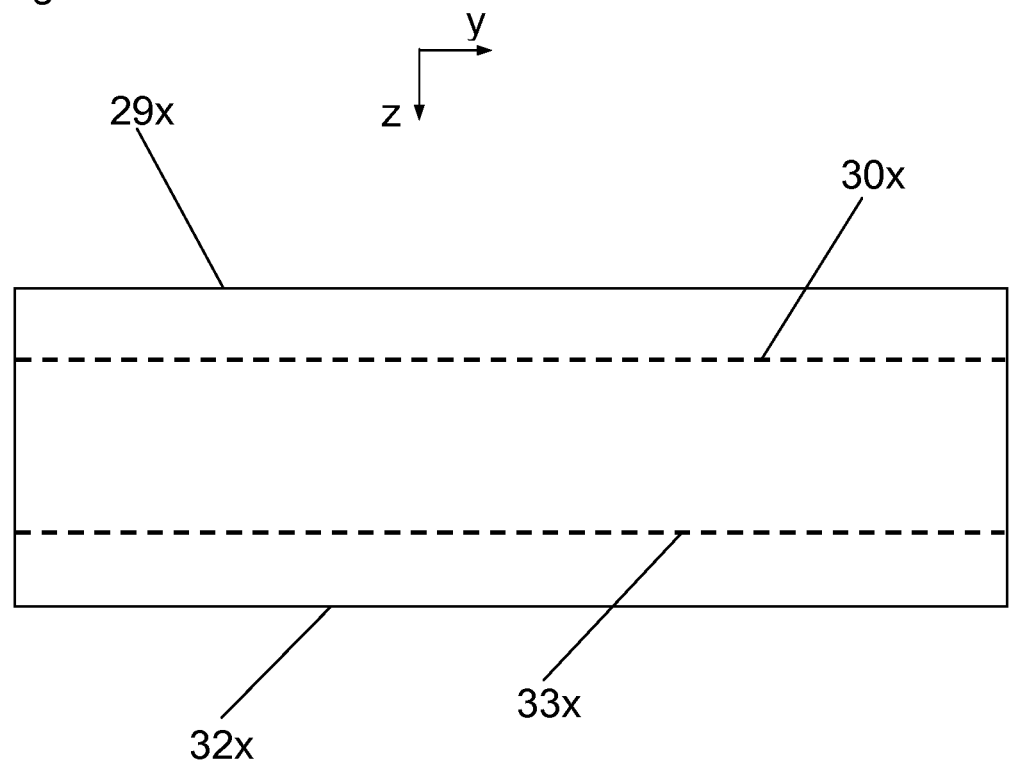

FIGS. 7A and 7B show the device with a substrate on which the first cylindrical lens array 28 with its convex and concave cylindrical lenses 29x, 30x and the second cylindrical lens array 31 with its convex and concave cylindrical lenses 32x, 33x are disposed on mutually opposite sides.

The invention claimed is:

1. A device for homogenizing light, comprising:
a first cylindrical lens array through which the light to be homogenized passes, said first cylindrical lens array having convex and concave cylindrical lenses with mutually parallel cylinder axes disposed next to one another in an alternating fashion; and
a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another, wherein said convex cylindrical lenses of said second cylindrical lens array have a focal length approximately as large as a distance between said first cylindrical lens array and said second cylindrical lens array.

2. The device according to claim 1, wherein in said given direction in which said cylindrical lenses are disposed next to one another, said concave cylindrical lenses of said first cylindrical lens array have at least one of an extent and a curvature other than that of said concave cylindrical lenses of said second cylindrical lens array in said given direction in which said cylindrical lenses are disposed next to one another.

3. The device according to claim 1, wherein in a propagation direction of the light to be homogenized, vertex lines of said concave cylindrical lenses of said first cylindrical lens array are substantially aligned with vertex lines of said concave cylindrical lenses of said second cylindrical lens array.

4. The device according to claim 1, wherein said mutually parallel cylinder axes of said cylindrical lenses of at least one of said first and said second cylindrical lens array are aligned perpendicular to said given direction in which said cylindrical lenses are disposed next to one another.

5. The device according to claim 1, wherein in said given direction in which said cylindrical lenses are disposed next to one another, said concave cylindrical lenses of said second cylindrical lens array are larger than said concave cylindrical lenses of said first cylindrical lens array.

6. The device according to claim 1, wherein in said given direction in which said cylindrical lenses are disposed next to one another, said convex cylindrical lenses of said first cylindrical lens array are larger than said concave cylindrical lenses of said first cylindrical lens array.

7. The device according to claim 6, wherein said convex cylindrical lenses of said first cylindrical lens array are larger by a multiple, than said concave cylindrical lenses of said first cylindrical lens array.

8. A device for homogenizing light, comprising:
a first cylindrical lens array through which the light to be homogenized passes, said first cylindrical lens array having convex and concave cylindrical lenses with mutually parallel cylinder axes disposed next to one another in an alternating fashion, said concave cylindrical lenses of said first cylindrical lens array having a focal length being larger than an extent of said convex cylindrical lenses of said first cylindrical lens array in a propagation direction of the light to be homogenized; and
a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another.

9. The device according to claim 8, wherein said concave cylindrical lenses of said first cylindrical lens array have said focal length being at least twice as large as an extent of said convex cylindrical lenses of said first cylindrical lens array in the propagation direction of the light to be homogenized.

10. A device for homogenizing light, comprising:
a first cylindrical lens array through which the light to be homogenized passes, said first cylindrical lens array having convex and concave cylindrical lenses with mutually parallel cylinder axes disposed next to one another in an alternating fashion; and
a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another, wherein in the given direction in which said cylindrical lenses are disposed next to one another, said concave cylindrical lenses of said first cylindrical lens array have approximately a same extent as said convex cylindrical lenses of said first cylindrical lens array in the given direction in which said cylindrical lenses are disposed next to one another.

11. A device for homogenizing light, comprising:
a first cylindrical lens array through which the light to be homogenized passes, said first cylindrical lens array having convex and concave cylindrical lenses with mutually parallel cylinder axes disposed next to one another in an alternating fashion; and
a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another, wherein said concave cylindrical lenses of said first cylindrical lens array have a focal length being larger than a focal length of said concave cylindrical lenses of said second cylindrical lens array.

12. A device for homogenizing light, comprising:
a first cylindrical lens array through which the light to be homogenized passes, said first cylindrical lens array having convex and concave cylindrical lenses with mutually parallel cylinder axes disposed next to one another in an alternating fashion;
a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another; and
a substrate on which said first cylindrical lens array and said second cylindrical lens array are disposed on mutually opposite sides.

13. A device for homogenizing light, comprising:
a first cylindrical lens array through which the light to be homogenized passes, said first cylindrical lens array having convex and concave cylindrical lenses with mutually parallel cylinder axes disposed next to one another in an alternating fashion;
a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another;

a first substrate;

a second substrate differing from said first substrate, said first cylindrical lens array disposed on said first substrate and said second cylindrical lens array disposed on said second substrate; and a third cylindrical lens array disposed on a side of said first substrate that is opposite said first cylindrical lens array, said third cylindrical lens array having convex and concave cylindrical lenses with mutually parallel cylinder axes disposed next to one another in an alternating fashion, said mutually parallel cylinder axes of said cylindrical lenses of said first cylindrical lens array are disposed perpendicular to said mutually parallel cylinder axes of said cylindrical lenses of said third cylindrical lens array.

14. The device according to claim 13, further comprising a fourth cylindrical lens array disposed on a side of said second substrate that is opposite said second cylindrical lens array, said fourth cylindrical lens array having convex and concave cylindrical lenses with mutually parallel cylinder axes that are disposed next to one another in an alternating fashion, said mutually disposed cylinder axes of said cylindrical lenses of said second cylindrical lens array are disposed perpendicular to said mutually parallel cylinder axes of said cylindrical lenses of said fourth cylindrical lens array.

15. The device according to claim 13, wherein said first substrate is spaced apart from said second substrate.

16. A device for homogenizing light, comprising:

a first cylindrical lens array through which the light to be homogenized passes, said first cylindrical lens array having convex and concave cylindrical lenses with mutually parallel cylinder axes disposed next to one another in an alternating fashion;

a second cylindrical lens array through which the light that has passed through said first cylindrical lens array can pass, said second cylindrical lens array having convex and concave cylindrical lenses with mutually parallel cylinder axes disposed next to one another in an alternating fashion, said mutually parallel cylinder axes of said cylindrical lenses of said second cylindrical lens array being aligned parallel to said mutually parallel cylinder axes of said cylindrical lenses of said first cylindrical lens array, and in a given direction in which said cylindrical lenses are disposed next to one another, said concave cylindrical lenses of said first cylindrical lens array have a configuration other than that of said concave cylindrical lenses of said second cylindrical lens array in said given direction in which said cylindrical lenses are disposed next to one another;

a first substrate;

a second substrate differing from said first substrate, said first cylindrical lens array disposed on said first substrate and said second cylindrical lens array disposed on said second substrate; and a third cylindrical lens array disposed on a side of said second substrate that is opposite said second cylindrical lens array, said third cylindrical lens array having convex and concave cylindrical lenses with mutually parallel cylinder axes that are disposed next to one another in an alternating fashion, said mutually disposed cylinder axes of said cylindrical lenses of said second cylindrical lens array are disposed perpendicular to said mutually parallel cylinder axes of said cylindrical lenses of said third cylindrical lens array.

* * * * *

UNITED STATES PATENT AND TRADEMARK OFFICE
CERTIFICATE OF CORRECTION

PATENT NO. : 7,532,406 B2  Page 1 of 1
APPLICATION NO. : 11/825800
DATED : May 12, 2009
INVENTOR(S) : Wieland Hill et al.

It is certified that error appears in the above-identified patent and that said Letters Patent is hereby corrected as shown below:

Title page, item (73) Assignee should read as follows: Limo Patentverwaltung GmbH & Co. KG
Gerstengrund (DE)

Signed and Sealed this

Twenty-ninth Day of June, 2010

David J. Kappos
*Director of the United States Patent and Trademark Office*